(12) United States Patent  
Zhou et al.

(10) Patent No.: US 9,222,586 B2  
(45) Date of Patent: Dec. 29, 2015

(54) VALVE FOR SWITCHING WATERWAYS AND ADJUSTING FLOW

(75) Inventors: Huasong Zhou, Xiamen (CN); Haisong Peng, Xiamen (CN); Meimei Xu, Xiamen (CN); Weiming Lin, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 204 days.

(21) Appl. No.: 13/977,604

(22) PCT Filed: Dec. 23, 2011

(86) PCT No.: PCT/CN2011/084530  
§ 371 (c)(1),  
(2), (4) Date: Jun. 28, 2013

(87) PCT Pub. No.: WO2012/089069  
PCT Pub. Date: Jul. 5, 2012

(65) Prior Publication Data  
US 2013/0276927 A1    Oct. 24, 2013

(30) Foreign Application Priority Data

Dec. 29, 2010  (CN) .......................... 2010 1 0612389  
Dec. 29, 2010  (CN) ...................... 2010 2 0688057 U

(51) Int. Cl.  
*F16K 11/22* (2006.01)  
*F16K 11/078* (2006.01)  
*F16K 31/60* (2006.01)

(52) U.S. Cl.  
CPC ............ *F16K 11/22* (2013.01); *F16K 11/0787* (2013.01); *F16K 31/605* (2013.01); *Y10T 137/87812* (2013.01)

(58) Field of Classification Search  
CPC .............. F16K 11/0787; F16K 31/605; F16K 31/52483; F16K 31/0617; F16K 11/0455; F16K 11/06; F16K 11/065; F16K 11/0716; E03C 1/0408; E03C 1/1023  
USPC .............................................. 137/625.17, 875  
See application file for complete search history.

(56) References Cited

U.S. PATENT DOCUMENTS 5,022,429 A * 6/1991 Rollini et al. ................. 137/218  
5,193,582 A * 3/1993 Antoniello et al. ...... 137/625.14  
(Continued)

FOREIGN PATENT DOCUMENTS

CN           2580240 Y     10/2003  
CN         201373141 Y     12/2009  
(Continued)

*Primary Examiner* — John K Fristoe, Jr.  
*Assistant Examiner* — Kevin Barss  
(74) *Attorney, Agent, or Firm* — Rabin & Berdo, P.C.

(57) ABSTRACT

A valve for switching waterways and adjusting flow has a fixed seat, a control piece and an operation mechanism. The fixed seat is provided with a fixed face, an inlet waterway and two outlet waterways, the inlet port of the inlet waterway and the outlet ports of the outlet waterway are arranged on the fixed face. The control piece is provided with a control face that is relied on the fixed face hermetically and a communicating groove that is concavely arranged on the control face. The operation mechanism is connected with the fixed seat and the control piece, and can drive the control piece to move, and then the control face can be driven to rotate and slide relative to the fixed face.

20 Claims, 7 Drawing Sheets

(56) References Cited

U.S. PATENT DOCUMENTS

| | | | | |
|---|---|---|---|---|
| 5,896,601 | A | * | 4/1999 | Humpert et al. .................. 4/677 |
| 5,901,387 | A | * | 5/1999 | Fan .................................... 4/675 |
| 5,960,828 | A | | 10/1999 | Grohe et al. |
| 7,143,261 | B2 | * | 11/2006 | Maeda et al. ................. 711/170 |
| 7,299,510 | B2 | * | 11/2007 | Tsai .................................. 4/601 |
| 7,373,954 | B2 | * | 5/2008 | Zhadanov et al. ....... 137/625.47 |
| 7,458,112 | B1 | * | 12/2008 | Yang ................................. 4/601 |
| 2006/0162793 | A1 | * | 7/2006 | Di Nunzio ............... 137/625.46 |
| 2006/0219304 | A1 | * | 10/2006 | Di Nunzio ................ 137/625.4 |
| 2007/0044850 | A1 | * | 3/2007 | Pieters .......................... 137/597 |
| 2009/0255599 | A1 | * | 10/2009 | Bolgar et al. ................. 137/625 |
| 2009/0276953 | A1 | | 11/2009 | Hsu et al. |
| 2009/0277522 | A1 | * | 11/2009 | Huang .......................... 137/876 |
| 2011/0259454 | A1 | * | 10/2011 | Tsai ......................... 137/565.17 |

FOREIGN PATENT DOCUMENTS

| CN | 201909066 U | 7/2011 |
|---|---|---|
| CN | 102207209 A | 10/2011 |
| EP | 0246405 A1 | 11/1987 |
| JP | 2002323166 A | 11/2002 |

* cited by examiner

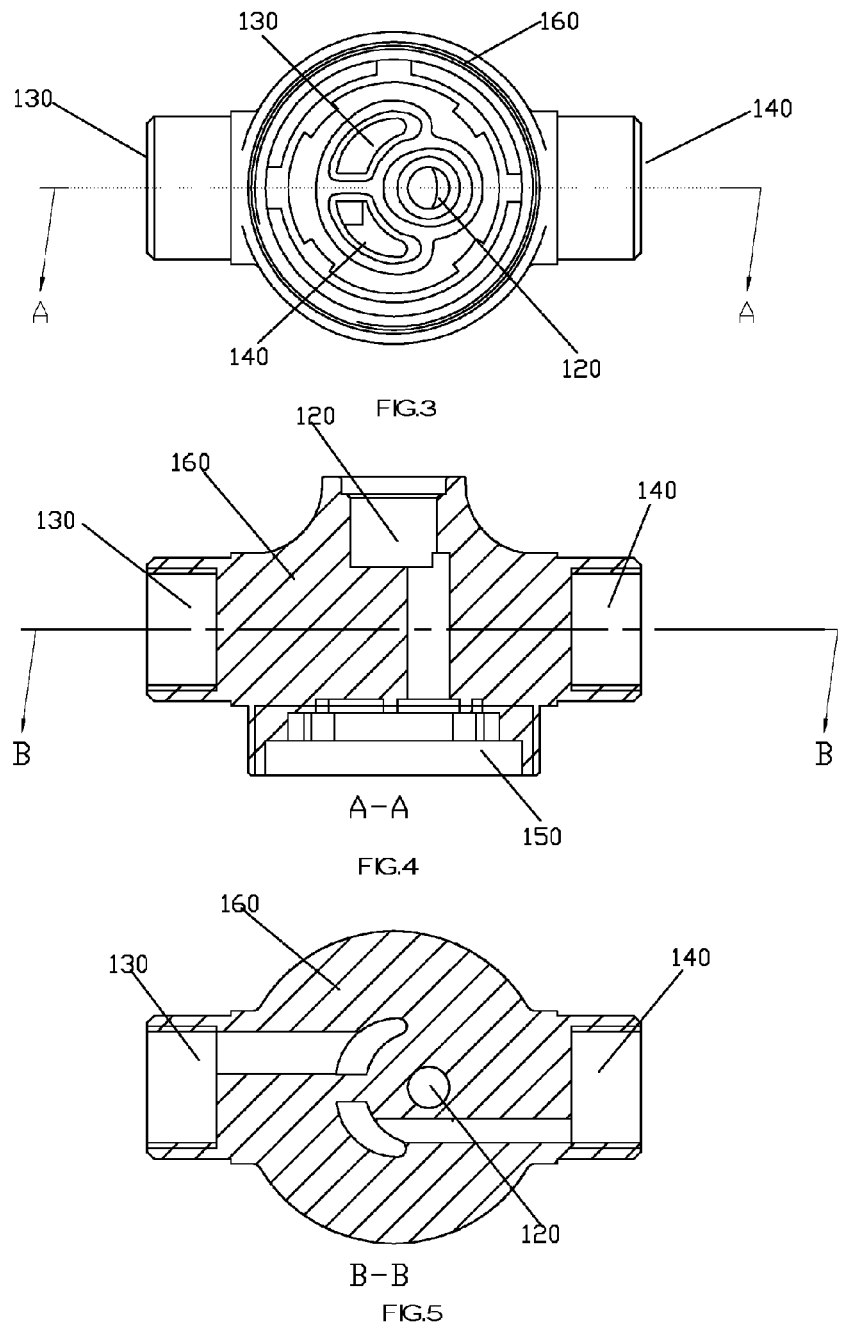

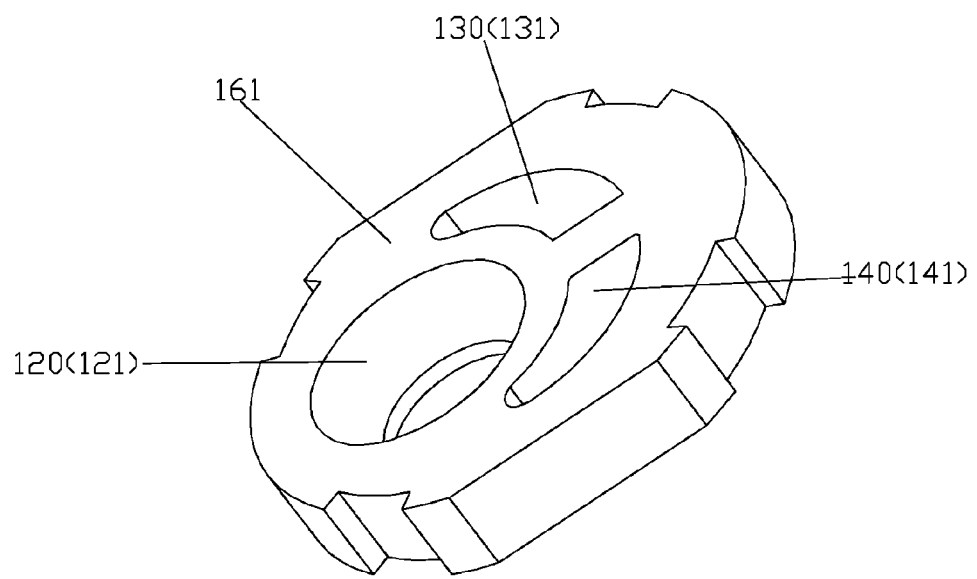
FIG.6
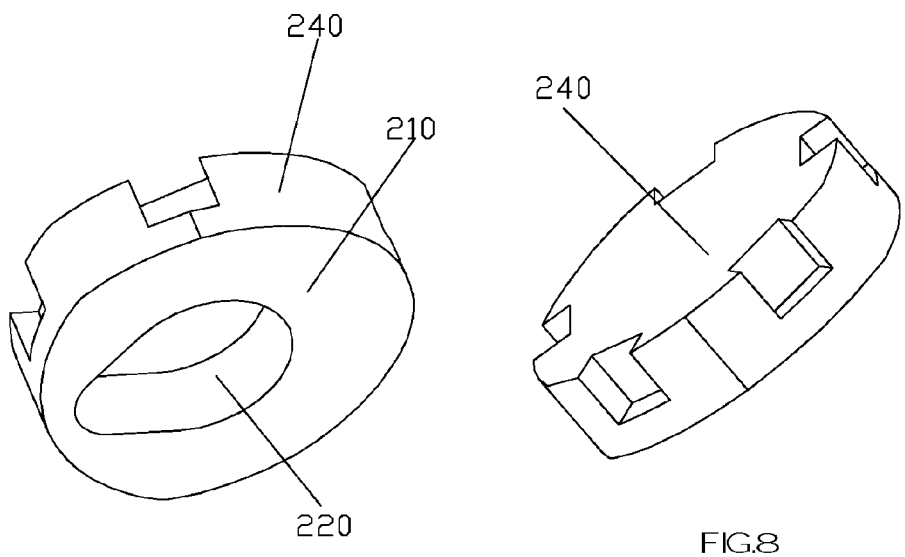
FIG.7
FIG.8

VALVE FOR SWITCHING WATERWAYS AND ADJUSTING FLOW

FIELD OF THE INVENTION

The present invention relates to a valve for switching waterways and adjusting flow.

BACKGROUND OF THE INVENTION

The valves for waterways mainly comprises the waterway switch valve and the flow adjusting valve, and the bathroom equipments at the prior are usually provided with the waterway switch valve and the flow adjusting valve simultaneously to meet the diversified waterway spray functions and water-saving function. Because of the separate set of the waterway switch valve and the flow adjusting valve, the defects are present: 1 the space occupation is large because of the increased bathroom accessories; 2 the material used is too much with increased manufacture cost and resource waste; 3 the switch is inconvenient, and the users need to operate the two valves successively.

SUMMARY OF THE INVENTION

The object of the present invention is to offer a valve for switching waterways and adjusting flow which overcomes the defects of the waterway valve at the prior art.

The technical proposal solving the technical matter in the present invention is:

Valve for switching waterways and adjusting flow, comprises:

A fixed seat (100), is provided with a fixed face (110), an inlet waterway (120) and two outlet waterways (130, 140), inlet port (121) of the inlet waterway (120) and outlet ports (131, 141) of the outlet waterways (130, 140) are arranged on the fixed face (110);

A control piece (200), is provided with a control face (210) that is relied on the fixed face (110) hermetically and a communicating groove (220) that is concavely arranged on the control face (210), and the communicating groove (220), the inlet port (121) and the outlet ports (131, 141) are cooperating with each other, so that: the relative rotation of the control face (210) and the fixed face (110) can achieve the switch of the two outlet ports (131, 141) at least, and the relative sliding of the control face (210) and the fixed face (110) can achieve the flow adjustment; and An operation mechanism (300), is connected with the fixed seat (100) and the control piece (200), and can drive the control piece (200) to move, and then the control face (210) can be driven to rotate and slide relative to the fixed face (110).

In a preferred embodiment, the communicating groove (220) is divided into a communicating part and a switch part, and the communicating part is always communicated with the inlet port (121), and the switch part can be communicated with the two outlet ports (131, 141) alternatively.

In a preferred embodiment, the interval part between the two outlet ports (131, 141) is bigger than the switch part, and the switch part can be located between the two outlet ports (131, 141).

In a preferred embodiment, the projection of the switch part is fan-shaped.

In a preferred embodiment the fixed seat (100) is provided with a mounting cavity (150) on the same side thereof as the fixed face (110), and the control piece (200) is provided with a connecting groove (230);

The operation mechanism (300) comprises:

A limiting body (310), is sleeved in the mounting cavity (150) in a rotation manner, and is provided with a penetrating hole (311) inside;

A deflector rod (320), of which the lower end is spliced into the connecting groove (230), the section is rectangle, and of which the first direction space is adaptive to the corresponding direction space of the connecting groove (230), and of which the second direction space is smaller than the corresponding direction space of the connecting groove (230), and of which the upper end passes through the penetrating hole (311), and a pivot (321) is arranged to pass through the middle of the deflector rod (320) and the limiting body (310); and A handle (330), is connected to the upper end of the deflector rod (320) in a fixing manner.

In a preferred embodiment, the fixed seat (100) comprises a body (160) and a gland nut (170); a groove is concavely arranged on the top surface of the body (160), and a stator (161) is arranged at the groove in a fixing manner, and the end face of the stator (161) is the fixed face (110), and the inlet waterway (120) and the outlet waterways (130, 140) are arranged to the body (160); the gland nut (170) is fixed to the top part of the body (160), and the mounting cavity (150) is generated through the cooperation of the groove and the inner hole of the gland nut (170).

In a preferred embodiment, the control piece (200) comprises a rotor (240) and a holding body (250), and the communicating groove (220) is arranged on the bottom surface of the rotor (240), and the connecting groove (230) is arranged on the top surface of the holding body (250), and the bottom surface of the holding body (250) is relied on the top surface of the rotor (240) and generates a synchronous and coaxial rotation connection relationship.

In a preferred embodiment, the first dimension of the deflector rod (320) is adaptive to the first direction space of the penetrating hole (311), and the second dimension of the deflector rod (320) is smaller than the corresponding direction space of the penetrating hole (311).

In a preferred embodiment, the handle (330) comprises a fixing part (331) and a hand shank (332) that are fixed together, and a fixing groove is arranged under the fixing part (331), and the fixing groove is connected with the upper end of the deflector rod (320) in a fixing manner.

Compared with the technical proposal at the prior, the benefits of the present invention are:

1 the control piece is driven to move by the operation mechanism, and then the control face is driven to rotate and slide relative to the fixed face, the relative rotating can achieve the switch function of a plurality of outlet ports and the waterways switch function, and the relative sliding can achieve the flow adjusting function, and then the defects at the prior art are overcomes with the following technical effects: a, the waterway switch valve and the flow adjustment valve share the same elements with lower manufacture cost and smaller space occupation; b, the users can conveniently drive the control face to rotate and slide only through the operation mechanism;

2 the switch part is between the two outlet ports, not only the multiple outlet ports switch is achieved, but also the water stop function;

3 the projection of the switch part is fan-shaped with easy flow adjustment;

4 the handle swings relatively, and then the deflector rod is driven to swing relative to the limiting body, and the control piece is moved to slide relative to the fixed seat through the lower end of the deflector rod, and then the control face slides relative to the fixed face, and then the flow adjustment is achieved, the handle rotates relatively, and then the limiting body and the control piece are driven to rotate relative to the fixed seat, and the control piece rotates relative to the fixed face, and then the waterways switch is achieved, therefore the waterways switch and the flow adjustment can be controlled only through a handle with convenient and fast operation, and the two functions above can be processed simultaneously, and different switch position will not affect different flow adjustment, and the operation above can be circulated;

5 the fixed seat comprises the body and the gland nut with easy assembly and low processing cost;

6 the communicating groove is arranged on the bottom surface of the rotor and the connecting groove is arranged on the top surface of the holding body with simple structure and low processing cost;

7 the first dimension of the deflector rod is adaptive to the first direction space of the penetrating hole, and the second dimension of the deflector rod is smaller than the corresponding dimension of the penetrating hole, so that the operation accuracy is guaranteed with longer service life.

BRIEF DESCRIPTION OF THE DRAWINGS

With the following description of the drawings and specific embodiments, the invention shall be further described in details.

FIG. 3 shows the top view of the locking mechanism of the body of the valve in a preferred embodiment;

FIG. 4 shows the sectional view of FIG. 3 A-A;

FIG. 5 shows the sectional view of FIG. 4 B-B;

FIG. 6 shows the solid view of the stator in a preferred embodiment;

FIG. 7 shows the first solid view of the rotor in a preferred embodiment;

FIG. 8 shows the second solid view of the rotor in a preferred embodiment;

DESCRIPTION OF THE PREFERRED EMBODIMENTS

Figure 1:
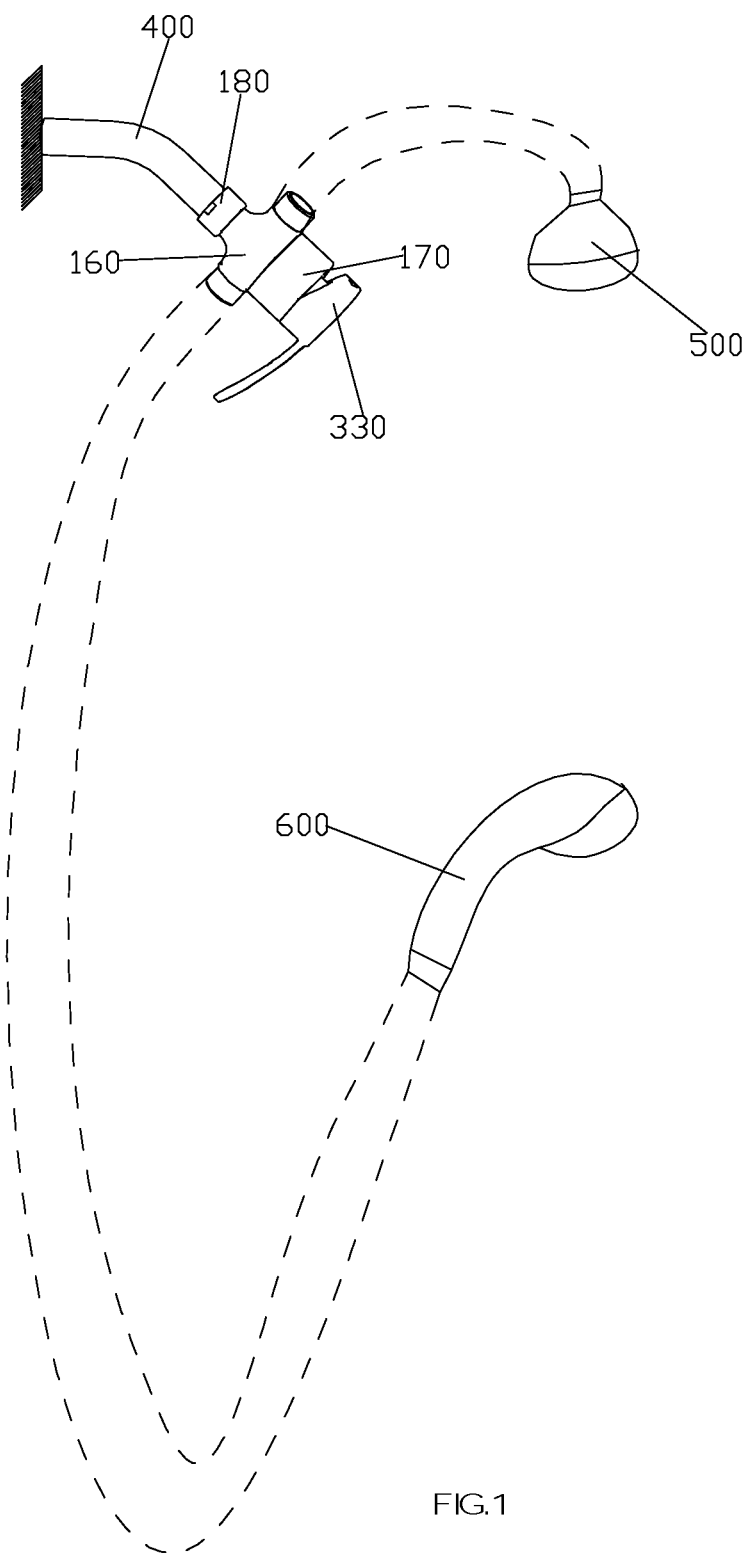
FIG. 1 shows the using view of the valve in a preferred embodiment.
Figure 2:
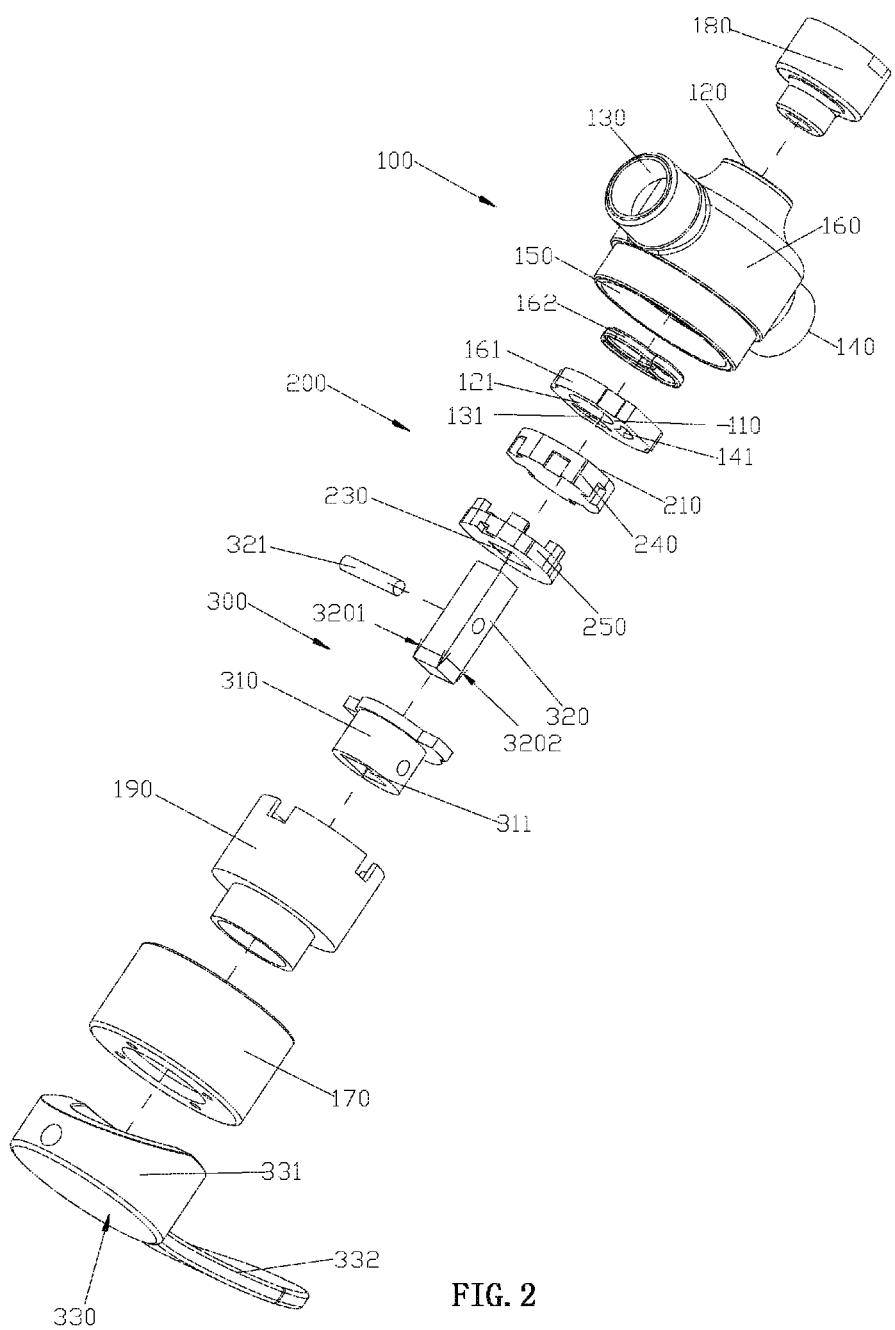
FIG. 2 shows the solid exploded view of the valve in a preferred embodiment.

According to FIG. 1 to FIG. 14, the valve for switching waterways and adjusting flow, comprises a fixed seat 100, a control piece 200 and an operation mechanism 300.

The fixed seat 100 comprises a body 160, a gland nut 170, a connector 180 and a fixed shell 190.

The top surface of the body 160 is concavely arranged to be a groove, and a stator 161 is fixed on the bottom surface of the groove, and the top surface of the stator 161 is defined as a fixed face 110, and a first inlet hole and two first outlet holes arranged in the stator 161 in an against and penetrating manner. And it is better that a gasket 162 is arranged between the stator 161 and the bottom surface of the groove. A second inlet hole and two second outlet holes are arranged in the body 160. And the stator 161 is mounted in the groove of the body 160, so that: the first inlet hole is communicated with the second inlet hole to generate the inlet waterway 120, and the inlet port 121 of the inlet waterway 120 is arranged on the fixed face 110;

The two first outlet holes are communicated with the two second outlet holes respectively to generate two outlet waterways 130 and 140, and the outlet ports 131 and 141 of the two outlet waterways 130 and 140 are arranged on the fixed face 110, wherein, the inlet port 121 and the outlet ports 131 and 141 are arranged alternately, and the outlet ports 131 and 141 is arranged symmetrically relative to the inlet port 121.

The connector 180 is fixed to the body 160, wherein, the connector 180 can be fixed to and communicated with the impending arm 400, and water can be introduced into the inlet waterway 110 through the connector 180 from water source.

The fixed shell 190 is connected to the groove of the body in a locating manner, and the gland nut 170 is sleeved to the fixed shell 190 and screwed with the groove of the body 160, so that the fixed shell 190, the gland nut 170 and the body 160 are fixed together, wherein, the groove and the inner hole of the fixed shell 190 of the gland nut are cooperating with each other to form a mounting cavity 150.

The control piece 200 comprises a rotor 240 and a holding body 250. The bottom surface of the rotor 240 is defined as a control face 210, a communicating groove 220 is concavely arranged on the bottom of the rotor 240, and a connecting groove 230 is concavely arranged on the top surface of the holding body 250. The bottom surface of the holding body 250 is relied on the top surface of the rotor 240 and a synchronous and coaxial rotation connection relationship is generated. And the communicating groove 220 is divided into a communicating part and a switch part, and the projection of the switch part is fan-shaped.

The rotor 240 is mounted in the mounting cavity 150 in a moving manner, and under the relying action of the gland nut 170 and the limiting body 310, the control face 210 of the rotor 240 is relied on the fixed face 110 of the stator 161 hermetically, wherein, the communicating part of the communicating groove 220 is always communicated with the inlet port 121, and the switch part can be communicated with the two outlet ports 131 and 141 alternatively and can be between the two outlet ports 131 and 141 (the interval part between the two outlet ports 131 and 141 is bigger than the switch part), and according to FIG. 9 to 14, three switch states are described respectively.

The communicating groove 220, the inlet port 121 and the outlet ports 131 and 141 are cooperating with each other, so that: the relative rotation between the control face 210 and the fixed face 110 can achieved the switch between the outlet ports 131 and 141 at least, and the relative sliding between the control face 210 and the fixed face 110 can achieve flow adjustment.

The operation mechanism 300 comprises a limiting body 310, a deflector rod 320 and a handle 330.

The limiting body 310 is sleeved in the mounting cavity 150 of the fixed seat 100 in a rotating manner, and is provided with a penetrating hole 311 inside of which the section is rectangle.

The section of the deflector rod 320 is rectangle, the lower end of which is inserted into the connecting groove 230 of the control piece 200, and of which the first dimension 3201 is adaptive to the corresponding dimension of the connecting groove 230, and of which the second dimension 3202 is smaller than the corresponding dimension of the connecting groove 230, and the first and the second directions are vertical to each other. The first dimension 3201 of the deflector rod 320 is adaptive to the first dimension of the penetrating hole 311, and the second dimension 3202 of the deflector rod 320 is smaller than the corresponding dimension of the penetrating hole 311. The upper end of the deflector rod 320 passes through the penetrating hole 311, and a pivot 321 at the other end is arranged to passes through the middle of the deflector rod 320 and the limiting body 310.

The handle 330 comprises a fixing part 331 and a hand shank 332 that are fixed together, a fixing groove is arranged under the fixing part 331, which is connected with the upper end of the deflector rod 320 in a fixing manner.

According to FIG. 1, one outlet waterway 130 is communicated with the head shower 500, another outlet waterway 140 is communicated with the handheld shower 600.

Figure 9:
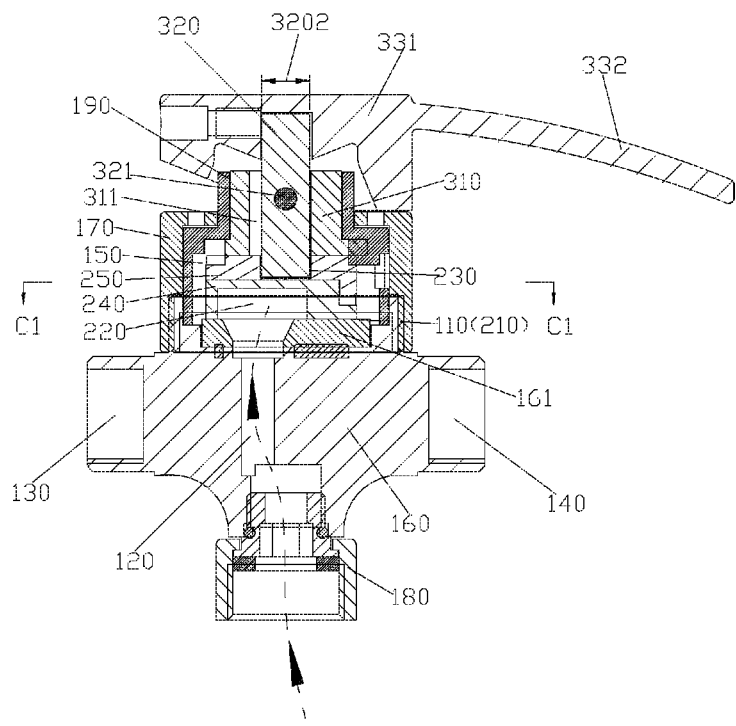
FIG. 9 shows the first sectional view of the valve in a preferred embodiment at water stop state.
Figure 10:
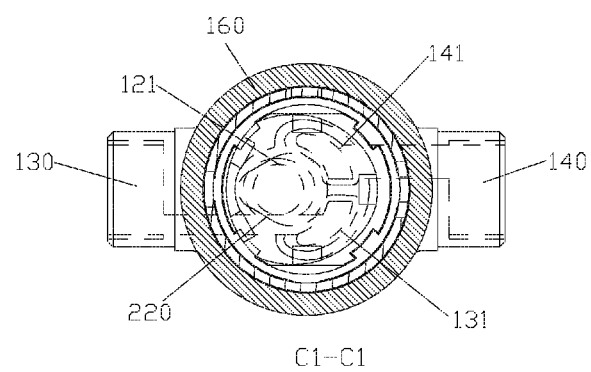
FIG. 10 shows the sectional view of FIG. 9 C1-C1.

According to FIGS. 9 and 10, at this time, the switch part of the communicating groove 220 of the rotor 240 is between the outlet ports 131 and 141, and the water stop state is present, and no water comes out of the two outlet waterways 130 and 140.

Figure 11:
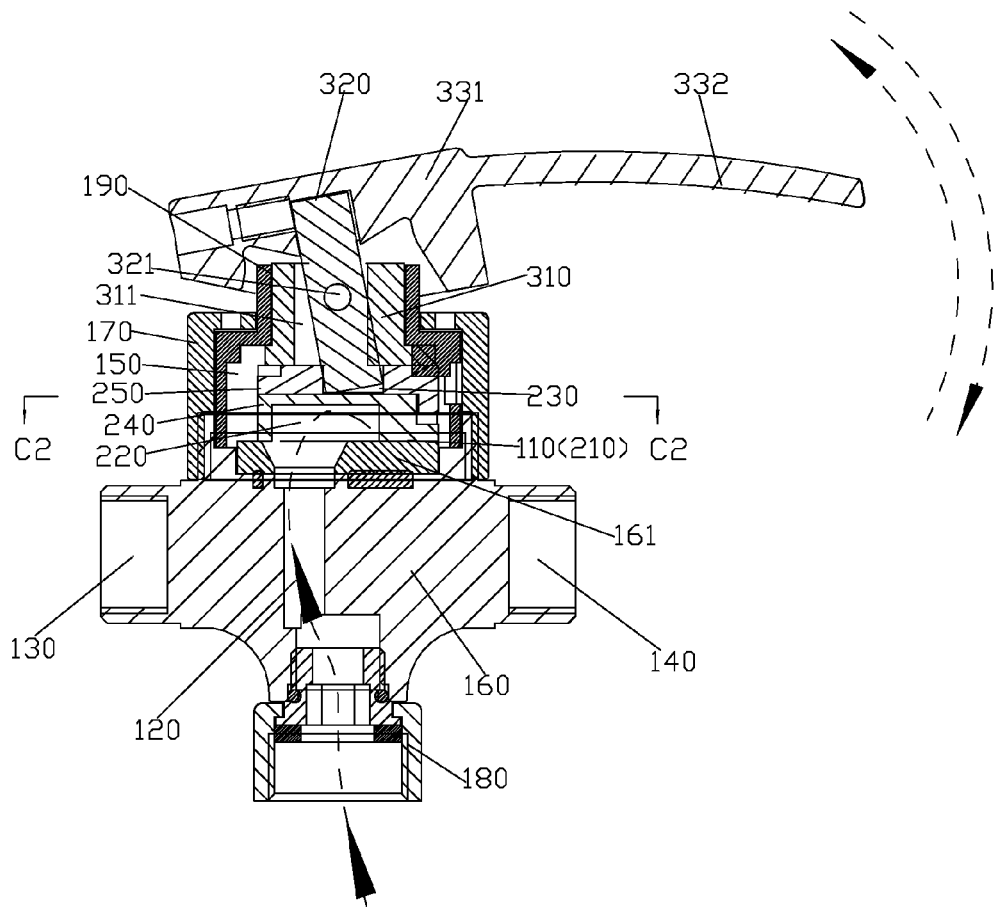
FIG. 11 shows the second sectional view of the valve in a preferred embodiment at the first water state.
Figure 12:
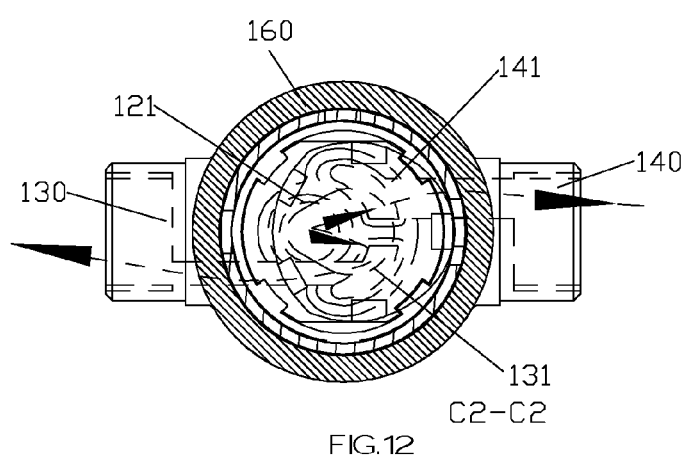
FIG. 12 shows the sectional view of FIG. 11 C2-C2.

According to FIGS. 11 and 12, the handle 330 can swing up and down relative to the fixed seat 110, and the deflector rod 320 can be driven to swing around the pivot 321 relative to the limiting body 310, the holding body 250 is moved by the lower end of the deflector rod 320 to slide relative to the stator 161, and then the rotor 240 slides relative to the stator 161, and then the control face 210 slides relative to the fixed face 110, so that the intersecting area of the switch part and the outlet ports is changed for flow adjustment.

Figure 13:
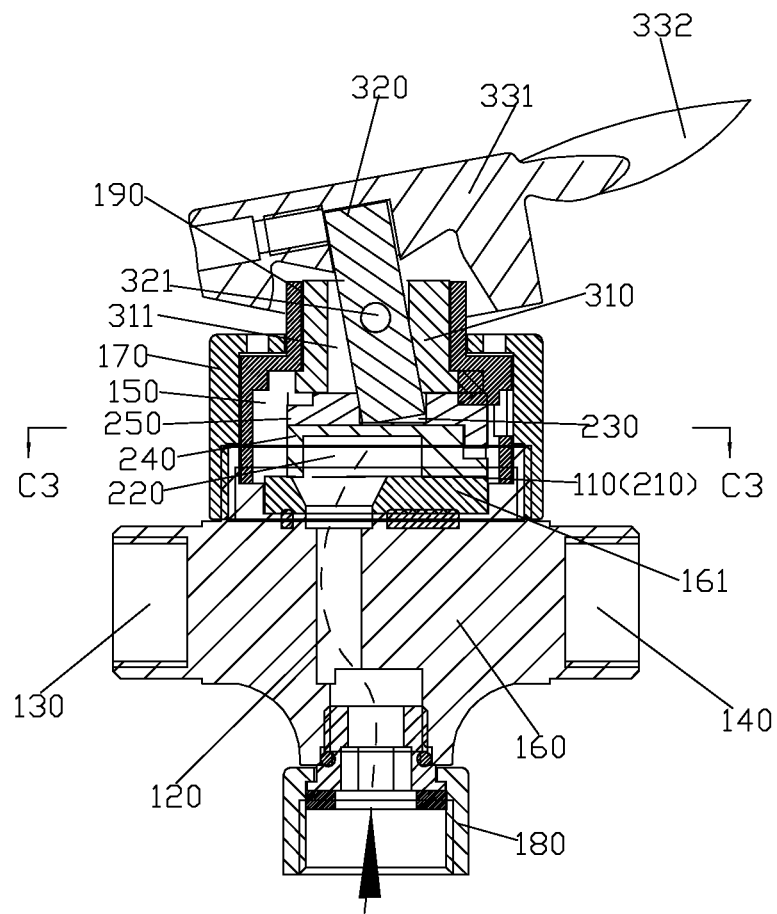
FIG. 13 shows the third sectional view of the valve in a preferred embodiment at the second water state.
Figure 14:
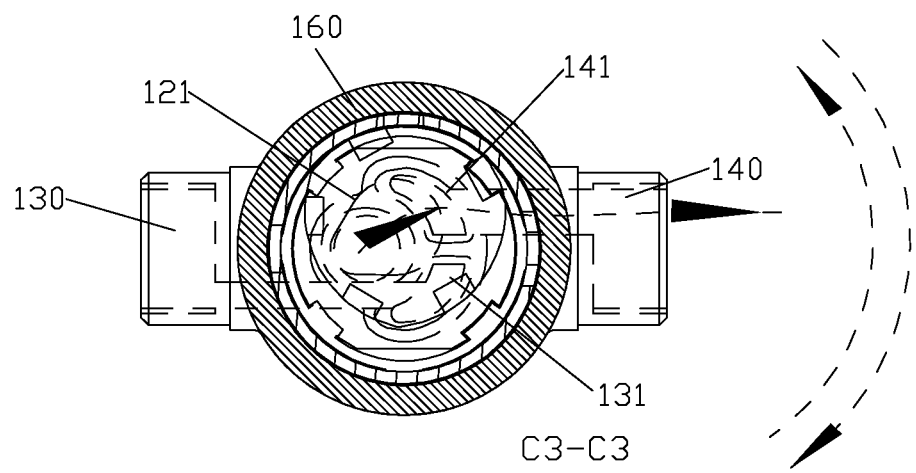
FIG. 14 shows the sectional view of FIG. 13 C3-C3.

According to FIGS. 13 and 14, the handle 330 is rotated relative to the fixed seat 100, and then the limiting body 310, the holding body 250 and the rotor 240 are driven to rotate relative to the stator 161, and then the control face 210 is rotated relative to the fixed face 110, so that the switch part is selectively at the outlet port 131, 141 or the position between the two outlet ports 131 and 141, such as: the switch part is at the outlet ports 131, and then the outlet ports 131 is communicated with the switch part, and then the outlet waterway 130 is communicated with the inlet waterway 120, and then water flows out of the outlet waterway 130; or the switch part is at the outlet ports 141, and then the outlet ports 141 is communicated with the switch part, and then the outlet waterway 140 is communicated with the inlet waterway 120, and then water flows out of the outlet waterway 140; or the switch part is between the two outlet ports 131 and 141 and at water stop state, so that the waterway switch function is achieved.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

INDUSTRIAL APPLICABILITY

In the valve for switching waterways and adjusting flow in the present invention, the control piece is driven to move by the operation mechanism, and then the control face is driven to rotate and slide relative to the fixed face, the relative rotating can achieve the switch function of a plurality of outlet ports and the waterways switch function, and the relative sliding can achieve the flow adjusting function.

What is claimed is:

1. A valve for switching waterways and adjusting flow, comprising:
   a fixed seat, provided with a fixed face, an inlet waterway and two outlet waterways, an inlet port of the inlet waterway and outlet ports of the outlet waterways arranged on the fixed seat;
   a control piece, provided with a control face sealed on the fixed face hermetically and a communicating groove concavely arranged on the control face, the communicating groove, the inlet port and the outlet ports cooperating with each other, so that relative axial rotation of the control face and the fixed face switches the inlet port between the two outlet ports at least, and relative linear sliding of the control face and the fixed face achieves flow adjustment; and
   an operation mechanism, connected with the fixed seat and the control piece, is configured to drive the control piece to move, so that the control face is driven to axially rotate and linearly slide relative to the fixed face.

2. The valve for switching waterways and adjusting flow according to claim 1, wherein,
   the fixed seat is provided with a mounting cavity on a same side of the fixed seat as the fixed face, and
   the control piece is provided with a connecting groove mating with the operating mechanism;
   the operation mechanism comprising:
   a limiting body, sleeved to rotate in the mounting cavity, and provided with a penetrating hole inside;
   a deflector rod, of which a lower end is spliced into the connecting groove, having a rectangular section, of which a first dimension is adaptive to a corresponding dimension of the connecting groove, and of which a second dimension, orthogonal to the first dimension is smaller than a corresponding dimension of the connecting groove, of which an upper end passes through the penetrating hole, and a pivot is arranged to pass through a middle of the deflector rod and the limiting body; and
   a handle, fixed to the upper end of the deflector rod.

3. The valve for switching waterways and adjusting flow according to claim 2, wherein,
   the fixed seat comprises a body and a gland nut;
   a groove is concavely arranged on a top surface of the body, and a stator is fixed to the groove,
   the end face of the stator is the fixed face,
   the inlet waterway and the outlet waterways are arranged to the body;
   the gland nut is fixed to the top part of the body, and
   a mounting cavity is generated through cooperation of the groove and an inner hole of the gland nut.

4. The valve for switching waterways and adjusting flow according to claim 2, wherein,
   the control piece comprises a rotor and a holding body,
   the communicating groove is arranged on the bottom surface of the rotor,
   the connecting groove is arranged on the top surface of the holding body, and
   the bottom surface of the holding body is relied on the top surface of the rotor and generates a synchronous and coaxial rotation connection relationship.

5. The valve for switching waterways and adjusting flow according to claim 2, wherein,
   the first dimension of the deflector rod is adaptive to the first dimension of the penetrating hole, and
   the second dimension of the deflector rod is smaller than the corresponding dimension of the penetrating hole.

6. The valve for switching waterways and adjusting flow according to claim 2, wherein,
   the handle comprises a fixing part and a hand shank that are fixed together,
   a fixing groove is arranged under the fixing part, and
   the fixing groove is fixed to the upper end of the deflector rod.

7. The valve for switching waterways and adjusting flow according to claim 1, wherein,
the communicating groove is divided into a communicating part and a switch part,
the communicating part always communicates with the inlet port, and
the switch part is configured to communicate with the two outlet ports alternatively.

8. The valve for switching waterways and adjusting flow according to claim 7, wherein,
the fixed seat is provided with a mounting cavity on a same side of the fixed seat as the fixed face, and
the control piece is provided with a connecting groove mating with the operating mechanism;
the operation mechanism comprising:
a limiting body, sleeved to rotate in the mounting cavity, and provided with a penetrating hole inside;
a deflector rod, of which a lower end is spliced into the connecting groove, a section is rectangular, of which a first dimension is adaptive to a corresponding dimension of the connecting groove, of which a second dimension, orthogonal to the first dimension is smaller than a corresponding dimension of the connecting groove, of which an upper end passes through the penetrating hole, and a pivot is arranged to pass through the middle of the deflector rod and the limiting body; and
a handle, connected to an upper end of the deflector rod in a fixing manner.

9. The valve for switching waterways and adjusting flow according to claim 8, wherein,
the fixed seat comprises a body and a gland nut;
a groove is concavely arranged on the top surface of the body,
a stator is fixed to the groove,
the end face of the stator is the fixed face,
the inlet waterway and the outlet waterways are arranged to the body;
the gland nut is fixed to the top part of the body, and
a mounting cavity is generated through cooperation of the groove and an inner hole of the gland nut.

10. The valve for switching waterways and adjusting flow according to claim 8, wherein,
the control piece comprises a rotor and a holding body,
the communicating groove is arranged on the bottom surface of the rotor,
the connecting groove is arranged on the top surface of the holding body, and
the bottom surface of the holding body is relied on the top surface of the rotor and generates a synchronous and coaxial rotation connection relationship.

11. The valve for switching waterways and adjusting flow according to claim 8, wherein,
the first dimension of the deflector rod is adaptive to the first dimension of the penetrating hole, and
the second dimension of the deflector rod is smaller than the corresponding dimension of the penetrating hole.

12. The valve for switching waterways and adjusting flow according to claim 8, wherein,
the handle comprises a fixing part and a hand shank that are fixed together,
a fixing groove is arranged under a fixing part, and
the fixing groove is fixed to the upper end of the deflector rod.

13. The valve for switching waterways and adjusting flow according to claim 7, wherein,
the interval part between the two outlet ports is bigger than the switch part, and
the switch part is located between the two outlet ports.

14. The valve for switching waterways and adjusting flow according to claim 13, wherein,
the fixed seat is provided with a mounting cavity on a same side of the fixed seat as the fixed face, and
the control piece is provided with a connecting groove mating with the operating mechanism;
the operation mechanism comprising:
a limiting body, sleeved to rotate in the mounting cavity, and provided with a penetrating hole inside;
a deflector rod, of which a lower end is spliced into the connecting groove, a section is rectangular, of which a first dimension is adaptive to a corresponding dimension of the connecting groove, of which a second dimension, orthogonal to the first dimension is smaller than a corresponding dimension of the connecting groove, of which an upper end passes through the penetrating hole, and a pivot is arranged to pass through the middle of the deflector rod and the limiting body; and
a handle, fixed to an upper end of the deflector rod.

15. The valve for switching waterways and adjusting flow according to claim 14, wherein,
the fixed seat comprises a body and a gland nut;
a groove is concavely arranged on the top surface of the body,
a stator is fixed to the groove,
the end face of the stator is the fixed face,
the inlet waterway and the outlet waterways are arranged to the body;
the gland nut is fixed to the top part of the body, and
a mounting cavity is generated through cooperation of the groove and an inner hole of the gland nut.

16. The valve for switching waterways and adjusting flow according to claim 14, wherein,
the control piece comprises a rotor and a holding body,
the communicating groove is arranged on the bottom surface of the rotor,
the connecting groove is arranged on the top surface of the holding body, and
the bottom surface of the holding body is relied on the top surface of the rotor and generates a synchronous and coaxial rotation connection relationship.

17. The valve for switching waterways and adjusting flow according to claim 14, wherein,
the first dimension of the deflector rod is adaptive to the first dimension of the penetrating hole, and
the second dimension of the deflector rod is smaller than the corresponding dimension of the penetrating hole.

18. The valve for switching waterways and adjusting flow according to claim 14, wherein,
the handle comprises a fixing part and a hand shank that are fixed together,
a fixing groove is arranged under a fixing part, and
the fixing groove is fixed to the upper end of the deflector rod.

19. The valve for switching waterways and adjusting flow according to claim 7, wherein, the projection of the switch part is fan-shaped.

20. The valve for switching waterways and adjusting flow according to claim 13, wherein, the projection of the switch part is fan-shaped.

* * * * *